INVENTOR
Samuel P. Lyle,
BY
ATTORNEYS

INVENTOR
Samuel P. Lyle,
BY
ATTORNEYS

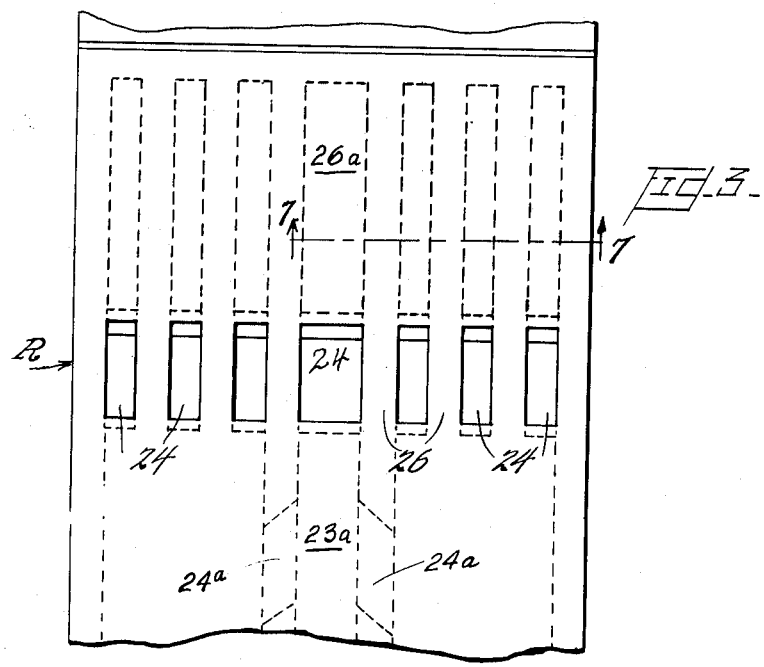
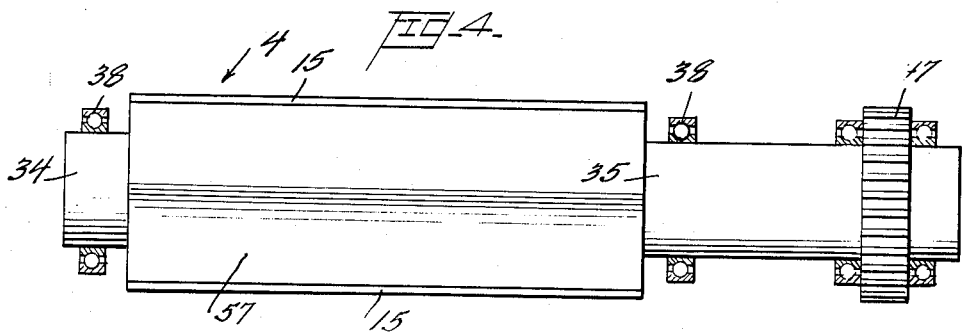
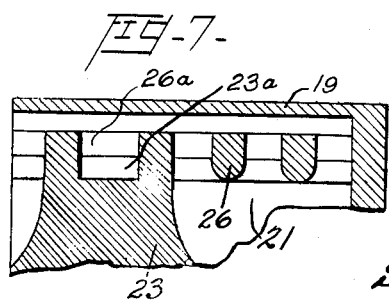

July 12, 1966　　　　　　　S. P. LYLE　　　　　　3,260,248
ROTARY ENGINE AND METHOD OF OPERATING SAME
Filed Aug. 21, 1963　　　　　　　　　　　　　10 Sheets-Sheet 4
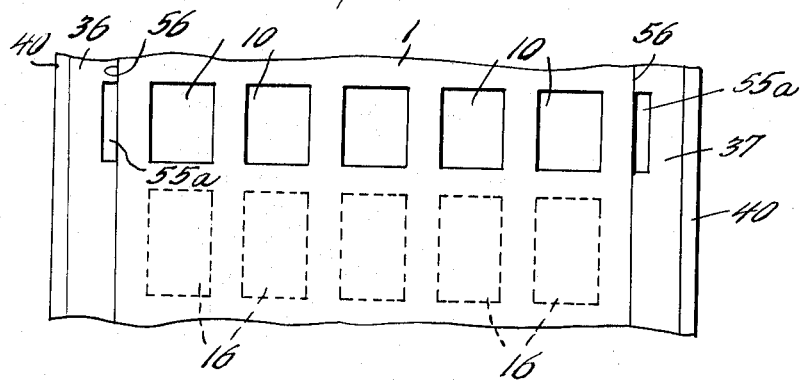
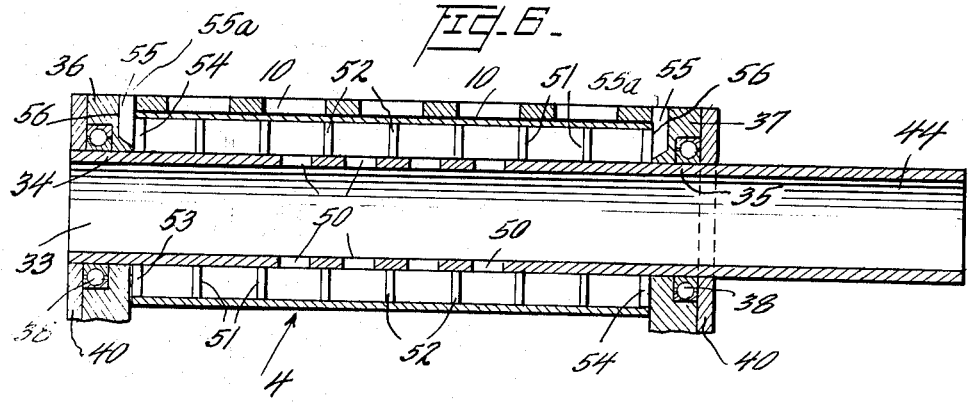
INVENTOR
Samuel P. Lyle,
BY Smith, Michael and Gardiner
ATTORNEYS July 12, 1966 S. P. LYLE 3,260,248
ROTARY ENGINE AND METHOD OF OPERATING SAME
Filed Aug. 21, 1963 10 Sheets-Sheet 5

INVENTOR
Samuel P. Lyle
BY
ATTORNEYS

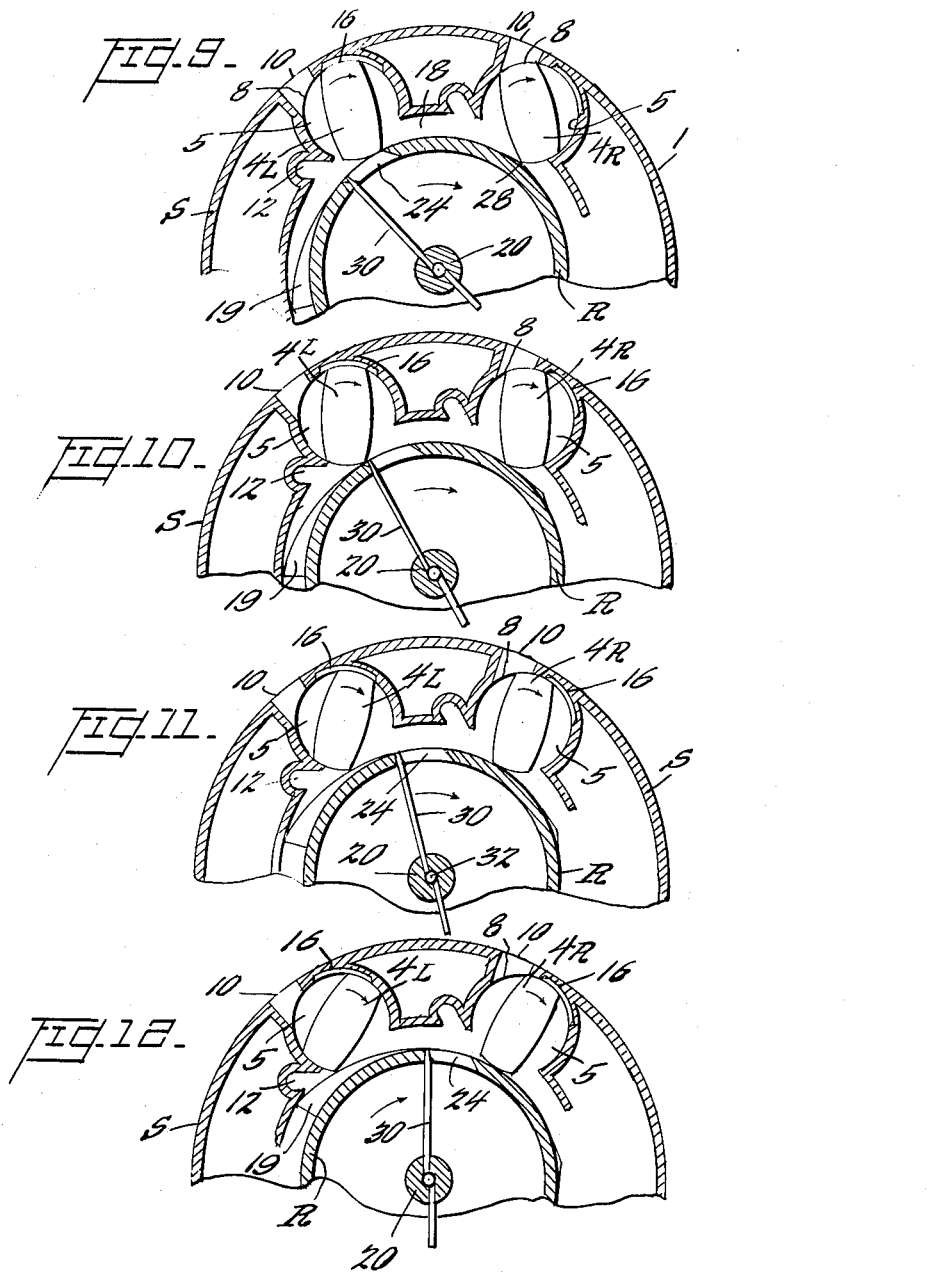

July 12, 1966  S. P. LYLE  3,260,248
ROTARY ENGINE AND METHOD OF OPERATING SAME
Filed Aug. 21, 1963  10 Sheets-Sheet 8
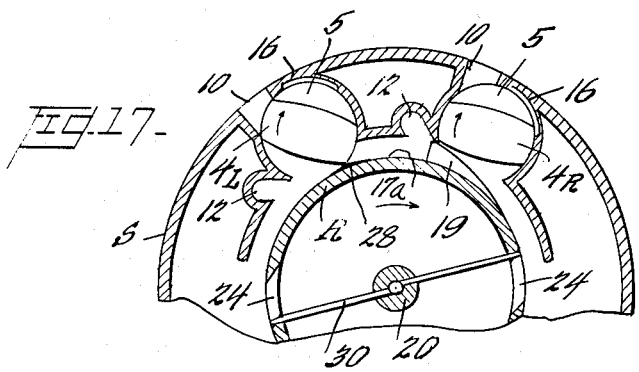
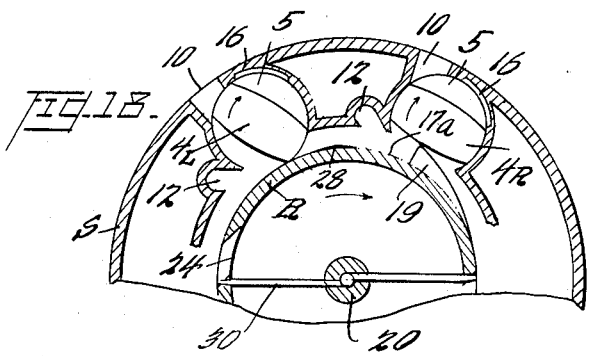
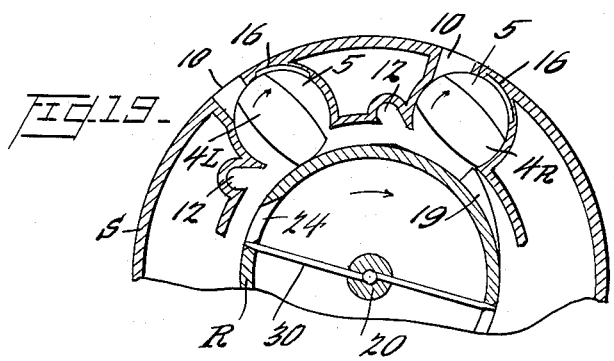
INVENTOR
Samuel P. Lyle,
BY
ATTORNEYS

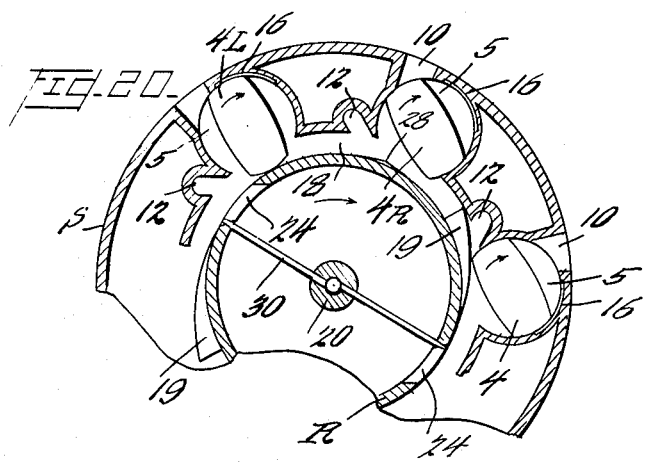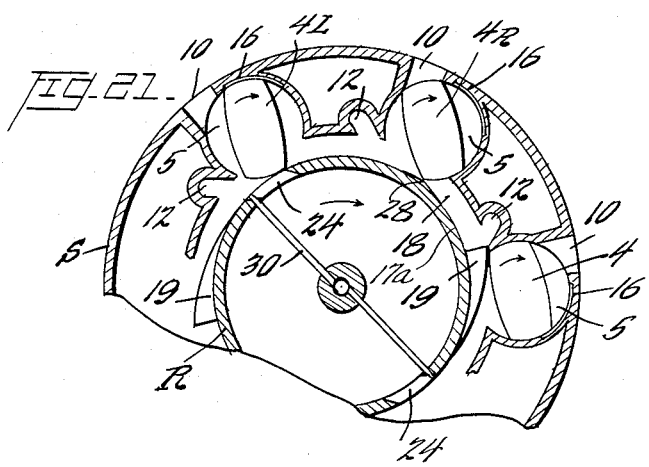

July 12, 1966   S. P. LYLE   3,260,248
ROTARY ENGINE AND METHOD OF OPERATING SAME
Filed Aug. 21, 1963   10 Sheets-Sheet 10
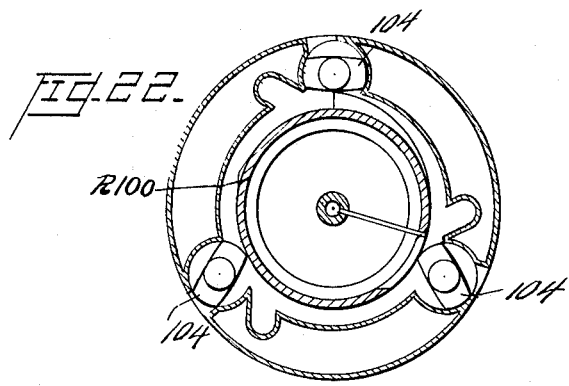
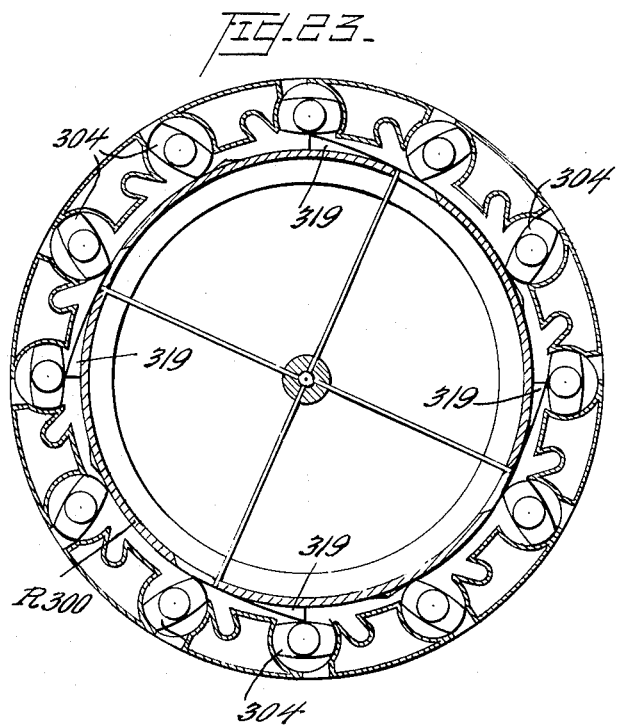
INVENTOR
Samuel P. Lyle,
BY
ATTORNEYS United States Patent Office 3,260,248
Patented July 12, 1966

3,260,248
ROTARY ENGINE AND METHOD OF
OPERATING SAME
Samuel P. Lyle, Washington, D.C.
(218 Spring St., Huntingdon, Tenn. 38344)
Filed Aug. 21, 1963, Ser. No. 303,639
37 Claims. (Cl. 123—13)

This invention relates to internal combustion rotary engines of a form in which a rotor carrying one or more pistons revolves in an annular chamber in a stator and wherein rotary valves in the stator operate to segregate successive arcuate combustion spaces in the annular chamber. In particular it relates to an internally cooled internal continuous combustion rotary engine having one or more arcuate gas cycle segments on the rotor within the arcuate extent of each of which a complete gas cycle including scavenging, intake, compression, continuous combustion-expansion, and exhaust, is performed and wherein the internal cooling is accomplished by flowing a volume of air in excess of combustion requirements through the combustion spaces of the engine, as each gas cycle segment on the rotor passes each rotary valve in the stator.

The prior art in rotary gas engine design has used principally the gas cycles of events established in reciprocating gas engine design. Some have followed a gas cycle of events comparable to reciprocating steam engines in which combustion is not in contact with the piston. The prior art in gas turbines utilizes combustion gases in the path of the rotor blades, but diluted with air, and not confined in a closed chamber during combustion expansion. Examples of prior art rotary internal combustion engines are Ross 1,831,263, Seldon 2,418,793.

This invention differs from the prior art by maintaining a continuous combustion-expansion force operating directly against the working face of a piston provided on each gas cycle segment on the rotor.

A primary object of this invention is to utilize continuous internal combustion in the gas cycle of a rotary engine.

A further object is to provide in an engine of the character described, means to supply air under pressure to cool the interior of the engine rotor, the annular chamber of the stator and the valves, and also to expel and scavenge exhaust gases. Also to provide air under pressure for the intake event of the cycle to be compounded in pressure in the compression event thus reducing the pressure differential during compression.

A further object of the invention is to provide in an engine of the character described means to cool the interior of each valve by centrifugal force developed within the valves during rotation drawing cooling air from the exterior of the engine through hollow valve shafts and expelling the air through exhaust ports in the ends of the valves.

A further object is to provide a rotary engine wherein the rotor and the valves of the engine rotate in the same direction and cooperate to successively perform a substantially complete gas cycle in each of several arcuate portions of an annular chamber within the stator successively segregated by said valves.

A further object is to provide arcuate gas cycle segments on the surface of an engine rotor coordinated with valve members operating to successively segregate portions of an annular chamber to perform substantially concurrently within the arcuate extent of each gas cycle segment on the rotor every event of the gas cycle.

A further object is to provide in a rotary engine means to insure a continuous generally radial flow of air under pressure from one or more ports in the engine rotor through one or more exhaust ports in the engine stator, thus to obtain generally radial movement of all the air and gases passing through the engine.

A further object is to utilize substantially one half of the arcuate length of a gas cycle segment on the rotor for the confined combustion-expansion event of the gas cycle.

A further object is to augment the sealing engagement between the surfaces of the rotor and the surfaces of the rotary valves by the opposed drag of gases as these surfaces pass each other in opposite directions.

A further object is to obtain high thermal and mechanical efficiency in a rotary engine by employing continuous combustion, in association with a free rotating rotor.

A further object of the invention is to provide in a rotary engine having a rotor with one or more piston members and a like number of gas cycle segments, and a stator having circumferentially spaced valves in number three times the number of pistons or gas cycle segments on the rotor, and having the valves and rotor operating in timed relation so as to perform concurrently a complete gas cycle within the arcuate extent of each gas cycle segment.

A further important object of the invention is to provide a rotary engine in which the speed and torque characteristics are determined by the number of arcuate gas cycle segments on the rotor thereof.

An additional object of the invention is to protect the timing gears of the engine from heat and the gear lubricant from contamination by disposing the timing gear box in spaced relation to the engine. This arrangement also facilitates tandem drives since a single timing gear set encased separately can serve one or more engines driving the same shaft.

Further and more specific objects of the invention will be apparent from the description of the following drawings, wherein FIG. 1 is a sectional view through an engine embodying the present invention, the section being taken on a transverse plane perpendicular to the axis of the rotor, FIG. 2 is a longitudinal sectional view taken on line 2—2 of FIG. 1, FIG. 3 is a fragmental plan view of the exterior surface of the rotor in the region of a piston, FIG. 4 is a side elevation of a valve, FIG. 5 is a fragmental plan view of a portion of the stator in the region of one of the exhaust ports, FIG. 6 is a partial sectional view of a valve and its mounting means, FIG. 7 is a sectional view taken on the line 7—7 of FIG. 3, FIG. 8 is a sectional view taken on the line 8—8 of FIG. 2, FIGS. 9 to 21 are diagrammatic views showing the relative positions of the valves and rotor at 15° intervals throughout 180° rotation of a valve, and FIGS. 22 and 23 are diagrammatic views, similar to FIG. 1, showing engines having one and four pistons, respectively.

In the accompanying drawings I have illustrated preferred embodiments of my invention and in the following description, like reference numerals have been used to designate like parts throughout.

GENERAL DESCRIPTION

The engine of this invention comprises a stator element indicated generally by the reference character S, and a rotor indicated generally by the reference character R. The stator is generally in the form of a right section of a hollow cylinder within which a rotor member R is mounted for free rotation. The rotor R carries piston members projecting from its surface and the piston members rotate freely in an annular combustion space provided between the rotor and the stator. Successive arcuate segments of this combustion space are segregated by a series of circumferentially spaced valves carried by the stator and having portions which are dimensioned to extend into the combustion space and sealingly engage surface portions of the rotor. Fuel is delivered to the arcuate combustion space and the valves successively segregate arcuate segments of the charged annular combustion space. The charges are successively compressed by the piston means on the rotor and then burned while the valves and rotor are operated in timed relation to maintain continuously on the working faces of the pistons a driving force due to the burning and expansion of the confined gases.

THE STATOR

More particularly, the stator includes an outer generally cylindrical wall member 1, and an inner generally cylindrical wall member 2, said wall members being maintained in spaced relation to provide a water jacket 3 through which water or similar cooling fluid may be circulated in a conventional manner, by means not shown. Although I have described here cooling means for the engine comprising a water jacket, it will be understood that if desired, and particularly in small horse power engines, the water jacket as such may be omitted and in lieu thereof the wall of the stator may be provided with conventional air cooling fins, not shown.

Valve members 4 are mounted in valve cavities 5 provided in the stator S and disposed in regulatory spaced relation circumferentially thereof. The valve pockets or cavities 5 extend through the stator from end to end and the valve members 4 are mounted therein for rotation about axes 6 generally parallel to the axis 7 of the stator S. The particular mounting for the valve members 4 will be more particularly described hereinafter.

Each of the valve cavities 5 is provided with ports 8 communicating with generally radial passages 9 opening through the outer wall 1 of the stator S and the respective valves, in operation, control the flow of fluid through these ports, to be hereinafter more fully explained. The ports 8 and passages 9 are arranged in a longitudinal series generally parallel to the axis of the valve cavity 5, as shown more clearly in FIGS. 5 and 6, and the passages 9 open through the outer wall 1 of the stator S to form exhaust ports 10. The exhaust ports 10 may be connected to any conventional form of exhaust manifold, not shown.

The valve cavities 5 are generally circular in cross sectional contour and the valve elements 4 have diametrically opposed end walls 15 which are sections of a cylinder concentric with the axis of rotation 6 of respective valves and which end walls slidingly engage the inner surface of the respective cavities 5. Intermediate the openings 8 and 11 in the several valve cavities, the respective inner walls thereof are relieved to provide a channel or passage 16 for a purpose to be hereinafter fully explained.

The inner wall 2 of the stator is provided with a circumferentially spaced series of inwardly directed-openings 11 communicating with the valve cavities respectively and through which portions of the respective valve members 4 extend periodically when the latter are rotated. Intermediate each pair of openings 11 and spaced circumferentially of the stator there is provided a compressed charge pocket or cavity 12. The cavities 12 extend longitudinally through the stator from end to end and each is provided with an inwardly directed opening 13. The walls 14 of the respective cavities 12 are inclined inwardly and forwardly with respect to the direction of rotaiton of the rotor, for a purpose which will be explained fully hereinafter.

THE ROTOR

The rotor R is generally cylindrical in form and is mounted for rotation concentrically of the stator S. The rotor as shown is dimentioned so that its outer wall 17 is disposed in spaced relation to the inner wall 2 of the stator S thereby to provide between the rotor and stator an annular combustion chamber 18. The rotor on its periphery is provided with one or more outwardly-extending piston members 19 each having a working face 19a, the modification shown in FIG. 1 disclosing a rotor with two such pistons. The piston members 19 extend beyond the periphery of the rotor to an extent to sealingly engage the surface of the wall 2 of the stator. As will presently appear, the pistons 19 and the several valves 4 are driven in timed relation so that the piston members may rotate freely within the annular space 18.

Within the generally cylindrical outer wall 17 of the rotor R the rotor is provided with means for compressing air which is to be delivered under pressure to the annular combustion chamber 18. To this end a centrifugal air compressor structure as indicated generally by the reference character C is provided including a central shaft section 20 to which are attached radially projecting vanes 21. The compressor C as shown in FIG. 2 is of the double-ended, central intake, radial discharge type drawing air through opposite open ends 22 of the rotor R and directing it radially outwardly by the centrally disposed air guiding structure indicated at 23 for discharge through ports 24 provided in the outer wall of the rotor.

The outer wall 17 of the rotor R carries a plurality of what I choose to call gas cycle segments, in number equal to the number of pistons 19 on the rotor. These arcuate segments in the engine shown in FIGS. 1 and 2 each occupies substantially 180° of the rotor surface and extend from the forward or leading edge of one of the ports 24 to the leading edge of the other of said ports 24. Within each of these arcuate segments all events of a complete gas cycle are being performed concurrently, hence my designation "gas cycle segments." It will be noted that each of the gas cycle segments spans the arcuate extent of that portion of the annual combustion chamber 18 controlled by three consecutively adjacent stator valves 4 as shown. The gas cycle segment performs a complete gas cycle as it passes each valve.

To aid in maintaining the outer wall 17 of the rotor cool, the inner surface of said wall 17 is provided with a series of generally circular, inwardly-directed cooling fins 25. Also, in order to aid in cooling the piston members 19, provision is made for circulating air from the compressor C along the inner surfaces of the piston members, and to this end the outer wall 17 of the rotor which underlies the piston formations 19 is slotted as shown in the detailed cross sectional view of FIG. 7 to provide a lattice work of bars 26 between and around which air delivered by the compressor may circulate. If desired, the fins 25 may be made to coincide with the bars 26 as shown.

The air guide structure 23 of the rotor, in the region of juncture with the outer wall 17 of the rotor is provided with a continuous circumferential air circulating channel 23a ported at 24 to the exterior of the rotor and ported at 26a to the interior of the piston 19, as shown in FIGS. 1 and 3. In order to provide for the circulation of air through the channel 23a the side walls thereof are ported as shown at 24a in FIGS. 1 and 3.

To further protect the surfaces of the rotor which are subject to high temperatures during combustion of the fuel charges, I propose to protect these surfaces by heat resistant metal, ceramals, and refractory material as shown at 27. The heat resistant laminations or coverings 27 are disposed on the working surfaces 19a of the piston members 19 and upon the outer surfaces 17a of the rotor which are immediately adjacent thereto in a trailing direction as referred to the direction of the rotor. In addition to the piston means 19 which project from the outer surface of the rotor R, the rotor is provided with a cutoff abutment formation 28 associated with each piston formation 19, the abutment members 28 being positioned on the surface of the rotor in trailing relation to the piston members 19 at a point rearwardly of the respective pistons, to properly determine a cutoff point in the cycle of combustion, as will presently be explained. The trailing surface 28a of the abutment means 28 is of the same curvature as is the corresponding portion on the leading surface of the piston 19, but between the pistons 19 and the abutments 28, the rotor is dimensioned with respect to opposed wall of the stator, as shown at 17a, to provide space for the ignition and expansion of a charge of combustible mixture compressed within the combustion chamber 12, adjacent thereto as will later appear.

A consideration of FIG. 2 will show that the ports 24 in the outer wall 17 of the rotor, adjacent to each piston 19, are arranged in a spaced series longitudinally of the rotor to deliver substantially uniformly the air and/or fuel charges into the annular combustion chamber 18.

Fuel, or combustible mixtures of fuel and air are fed to the combustion chamber 18 through the ports 24 by fuel nozzles 29 disposed within said ports 24 and being supplied with fuel or fuel and air mixtures by a fuel supply system including radially-disposed tubes or ducts 30 carried by the compressor shaft 20 and jointly having communication with an inner axially disposed bore 31 opening out through one end of the shaft 20 at 32 (see FIG. 2). The bore 31 may be supplied with fuel or fuel and air mixture from any conventional source thereof, not shown. It will be understood that the method just described of supplying fuel, or fuel and air mixtures to the engine, is but one way of accomplishing my purpose of delivering fuel to the engine under pressure developed centrifugally and to this end I may deliver the fuel or fuel and air to the rotor at any point inwardly of the outer periphery of the rotor and eccentric to the axis of the rotor which will insure or develop desired pressure in the fuel and air as it is discharged radially through the outer periphery of the rotor. Note that the arrangement of ports 24 are uncovered to deliver air to the segregated portion of the annular combustion chamber prior to the time the fuel nozzles 29 become effective to deliver fuel to said segment, see FIGS. 13 and 14.

MOUNTING MEANS FOR VALVES AND ROTOR

The stator structure S as previously described is provided with the several valve cavities 5 in which the rotary valves 4 are mounted. The valves 4 are each provided with a hollow central shaft 33 which extends from opposite ends of the respective valves and rotor structure to provide means for mounting the valves for rotation. Thus, as shown in FIG. 2 the shafts 33 are extended at 34 and 35, respectively, and these extensions are journalled in end rings 36 and 37, respectively, the latter furnishing support for said shaft ends and associated shaft bearings 38. The end rings 36 and 37 are each generally in the form of ring members. The end rings 36 and 37 also provide support for bearing members 39 which provide rotational support for the terminal or hub portions 39a of the rotor R.

The end rings 36 and 37 are disposed at opposite ends of the stator structure and in each instance have associated with the outer surfaces thereof, end plates 40. The plates 40 and the respective end rings 36 and 37 are mounted in place on opposite ends of the stator by any convenient means such as cap screws 41 which extend through the plates 40 and through the end rings 36–37, as shown in FIG. 2. The end plates 40 are provided with openings to receive the ends of the hollow shafts 33 of the valves 4 to provide for the entrance of air into these hollow shafts under the influence of centrifugal force when the valves are rotated, and as will be more fully explained hereinafter.

The end plates 40 are also each provided with a large central opening 42 for the entrance of air into the compressor.

As shown in FIG. 2, the shafts 33 for the several valves are extended at greater length at the right-hand ends thereof than at the left-hand ends thereof, these extensions being provided to enable the timing gear casing shown generally at 43 to be arranged in spaced relation with respect to the adjacent end wall of the engine by spacing collars or sleeves 43a. These shaft extensions are shown at 44 in FIGS. 2 and 6.

TIMING GEAR ARRANGEMENT

As previously indicated, the rotor R and the several valves 4 are driven in timed relation and to this end, I extend the compressor shaft 20 at one end (the right-hand end as viewed in FIG. 2) a distance sufficient to mount the timing gears thereon and in spaced relation to the engine. The timing gears include a central master gear 45 secured to the rotary shaft 20. The gear 45 is in mesh with a series of idle gears 46 mounted on stub shafts 46a as shown in FIG. 8. In turn, the several idle gears 46 are meshed with driven gears 47 of the same diameter as is the master gear 45, and the gears 47 are in each instance secured to an extended end 44 of a hollow valve shaft 33. The gearing arrangement as described insures that the several valve shafts 33 will operate in the same direction and speed as does the rotor shaft 20.

The several gears 45, 46 and 47 are for convenience shown as spur gears but in practice are preferably of double herring bone type and are conventionally mounted within the gear casing 43 as shown in FIG. 2, and by reason of the spaced relation of the gear casing 43 with respect to the adjacent end wall of the engine, air drawn into the compressor through the right-hand air entrance 42 thereof, will function to cool the gear casing and gears therein, and maintain, in effect, an insulating layer of moving air between the gear case and the engine. In order to provide for the smooth flow of air through this space and into the compressor, the left-hand end plate 48 of the gear case is provided with a central generally conic section 49 for directing air into the right-hand end opening 22 of the compressor. The end plate 40 of the stator and the end plate 48 of the timing gear casing 43 are preferably secured to the spacing collars or sleeves 43a by any convenient means such as integrally casting the same or by welding, as shown.

VALVES AND VALVE COOLING

As previously stated, means are provided for cooling the several valves 4 by inducing a flow of air therethrough. Thus, the hollow valve shafts 33 are each provided with a longitudinal series of apertures 50 (see FIG. 6) which provide communication between the interior of the shaft and the hollow interior of the valves, respectively. Interiorly, the valves are provided with transverse partitions 51, each of which is provided with air-circulating apertures 52 and end closure plates 53, the closure plates being provided at the ends of the respective valves and having diametrically disposed ports as shown at 54. The ports 54 cooperate with radial air discharge ducts 55 provided in the inner surfaces 56 of the end rings 36 and 37, respectively. From this structure it will be understood that as the valve members are rotated, air is drawn into the hollow shafts 33 through the open ends thereof and forced through the ports 50, 52 and 54, as the latter periodically come in register with the radial ducts 55. The latter communicate with exhaust ports 55a in the outer wall of the stator.

The valves 4 are generally ellipsoidal in cross sectional contour and have perpendicular axes of different lengths, see FIG. 1. The end surfaces 15 of the valves at the ends of the long axes are segments of a cylinder concentric with the axis of rotation of the valve, while the surfaces 57 of the valve at the ends of the short axis are segments of cylinders of equal radius eccentric to the axis of rotation but lying within the projection of the short axis of the valve. Thus, the valves 4 are symmetrically formed with respect to their respective long and short axes, and with respect to the center of rotation of the valves (see FIGS.

2 and 4). Note also that the long axes of the valves in cross section (see FIG. 1) are all parallel to each other.

IGNITION

Initial ignition for the engine is provided by spark plug means 58, shown in FIGS. 1 and 2 as mounted in a conventional manner within a well 59 in the stator wall 1, with the electrodes 60 of the plug disposed within one of the compressed charge cavities 12. As shown in FIG. 1, the plug 58 is disposed in the cavity 12 which occupies the "twelve o'clock" position in this view, but it will be understood that any one of the cavities 12 may carry the plug 58. Also, although only one plug 58 is shown, I may use two or more plugs spaced along the length of the cavity 12, if desired, in order to more evenly distribute the ignition or burning of the charge within the cavity 12. It will of course be understood that the plug or plugs 58 in operation, are connected to a conventional ignition system (not shown) which will supply electrical potential thereto for developing a spark between the terminals of the plugs at predetermined intervals. As will presently appear, once the engine has been driven by any suitable external source of power (not shown) through one revolution, the ignition system just described including the plugs 58 may be deenergized and continuous combustion within the engine will be maintained by carrying the flame from a charge of burning gas forward within the continuous combustion chamber 17a to a charge present in the cavity 12 as will be fully explained hereafter.

OPERATION

For a complete understanding of the operation of the engine, reference is made to FIGS. 9 through 21 wherein I have shown at 15° intervals the rotation of two adjacent valves, and the sequence of events which comprise a complete gas cycle in 180° of valve rotation including the ignition of a new charge, and in order to clarify repeated references to the valves 4 and parts associated therewith, I have in these figures further identified the left-hand valve and associated parts in each of these figures by the distinguishing letter L, and similarly have identified the right-hand valve and parts by the distinguishng letter R.

Referring to FIG. 9 in which the valve parts are shown in what will be considered to be the 0° position, it is assumed that the arcuate segment of the annular combustion chamber 18 between the valves 4L and 4R is filled with exhaust or burned gases of a previous gas cycle, and in this position four events are simultaneously at the initial stage, namely: the air port 24 is entering said segregated space at valve 4L; the valve 4R has just closed said space by making sealing engagement with the abutment 28; valve 4L is just opening bypass 16L; and valve 4R is just opening its exhaust port 8R.

In the 15° position shown in FIG. 10 the bypass 16L is fully open and the exhaust port 8R is partly open.

In FIG. 11, showing the 30° position of the parts, the valve 4L has just closed its bypass 16L. The small amount of exhaust gas in the valve pocket 5L has been expelled through the bypass 16L during this interval of 30° rotation, propelled by the air from the compressor entering the air port 24. Fresh air has filled the pocket 5L and that portion of the segregated portion of the combustion chamber between the valves 4L and 4R which has been passed by the air port 24. The air from the compressor continues to displace exhaust gases from the segregated portion of the annular combustion chamber and expel them through the now open exhaust port 8R. This exhaust continues through the 45° position of the parts as shown in FIG. 12.

In FIG. 13, showing the 60° position of the parts, the valve 4R is beginning to close the passage through which air flows into pocket 5R following the escape of exhaust gases through exhaust port 8R. The air port 24 closes a few degrees later to utilize the surge effect of the flow of air from the compressor to increase the volume and pressure of air entering prior to the compression event. The forward compression face of the piston 19 has entered the segregated space of the annular combustion chamber to compress the air segregated by the valves 4L and 4R. It should be noted at this point that the fuel nozzles 29 inject fuel into the compressed air within said segregated portion of the annular chamber during the arc of rotation from 15° through 60°. The fuel duct 30 in the shaft 20 of the compressor may supply either rich air-fuel mixture or fuel alone to the nozzles 29 but the nozzles never enter the air stream through the exhaust ports 8 due to the location and timing.

In FIG. 14 at the 75° point, the valve 4R has closed the passage to the exhaust port 8R and the fuel nozzles 29 are leaving the segregated space of the annular combustion chamber 18 while the piston 19 continues to compress the charge within the segregated portion of the annular combustion chamber into the gradually reducing space between said piston and the valve 4R.

FIG. 15 shows the parts at 90° of rotation, with the piston 19 approaching its final stage of compression of the fuel charge between it and the valve 4R.

In FIG. 16 showing the parts at 105° of rotation, the air fuel charge is being compressed into the charge receiving cavity 12 before the piston face 19a passes the charge pocket 12. Thus, the compression ratio may be effectively controlled by the volumetric capacity of charge pocket 12.

In FIG. 17 the parts are shown in 120° of rotation in which the piston 19 has just passed the mouth of the compressed charge cavity 12 thus discharging the compressed air-fuel mixture from this cavity immediately behind the working face of the piston 19. The burning gases in the continuous combustion arc 17a ignite the combustible mixture driving the piston 19 forward and at the same time driving the prior charge of burning gases rearward supplying fresh fuel at the front and pushing burned gases to the rear. The burned gases are separated from the fresh charge as valve 4L closes sealing engagement with the cutoff abutment 28. The rotor is propelled through 60° of rotation by this expanding charge as shown in FIGS. 17, 18, 19, 20 and 21.

In FIG. 18 the parts are shown in a 135° position of rotation wherein the working face of the piston 19 has exposed substantially one-half of the lower surfaces of valve 4R to pressure within that portion of the segregated annular combustion chamber in which the combustion arc 17a lies. During this period the left-hand end of the valve 4R is exposed to combustion pressures which are greater than the compression pressures effective on the right-hand end of said valve, thus transmitting a turning couple to the valve and through the timing gears to the main rotor shaft. This driving force is effective during the entire time the piston is passing the valve cavity. In all other positions of the valve throughout a gas cycle the pressures on all four faces of the valve are substantially equalized.

In FIG. 19 showing the 150° point of rotation of the valves, the burning gases have expanded to the full arcuate extent of the combustion chamber between the valves 4L and 4R, as compared with the arcuate extent of the segregated portion of the chamber shown at the 120° point of rotation at which point the expanding gases occupy substantially one-half the length of the arcuate distance between valves 4L and 4R. The gases continue to expand through the next 15° of rotation as shown in FIG. 20, where at the 165° point of rotation the piston 19 is almost in position to admit a fresh charge of compressed air-fuel from the next forward compressed charge cavity 12. At this point, the arcuate extent of the segregated arcuate segment of the annular combustion chamber is approximately twice as large as it appears in FIG. 17.

In FIG. 21, showing the parts at a point of 180° rotation of the valve, the gases have expanded further and the valve 4R has closed against the cutoff abutment 28 to separate the burned gases now in the segregated segment of the annular combustion chamber from the fresh charge just received in that portion of the chamber occupied by the continuous combustion arc 17a. This completes a gas cycle and the positions of the valves 4L and 4R in FIG. 21 are identical with the position of these valves in FIG. 9 showing the 0° point of rotation. That portion of the surface of the rotor occupied by the second piston 19 is now in position with respect to the valve 4L to start another gas cycle identical with the one just described.

It should be noted that the last two views showing the 165° and the 180° points of rotation (FIGS. 19 and 20) include in addition to the two valves 4L and 4R, the valve 4 next to the valve 4R (in the direction of rotation of the rotor) to show a portion of an adjacent segregated segment of the arcuate combustion chamber and to show where the increase in the length of the combustion-expansion event extends into said adjacent segment of the combustion chamber and is cut off at the cutoff abutment 28 by the valve 4R. Just prior to the engagement of the valve 4R with the abutment 28 a portion of the flame gas charge is carried forward over the crest of the piston 19 to ignite the compressed charge in the compressed charge cavity 12 adjacent to the valve 4 to maintain continuous combustion-expansion as previously described.

It is important to note that in the present engine the compression ratio is controlled by the volumetric capacity of the compressed charge cavity 12; whereas the expansion ratio is controlled by the volumetric capacity of the annular combustion chamber 18 and the volumetric capacity of the valve cavities 5. This is in contrast to reciprocating engine design where the expansion and compression ratios are both controlled by the volumetric capacity of the cylinders.

SUMMARY

Having thus described the engine of this invention it should be noted that the piston working face 19a moves forward continuously propelled by continuous expansion as well as continuous combustion. The propelling force of a fresh fuel charge is renewed just before cutoff. Only the expended and expanded gases are cut off for the exhaust event.

It should also be noted that the flow of air through the rotor and engine is continuous as the air port 24 and at least one of two exhaust ports 10 nearest it is open at all times, as each air port 24 on the rotor passes successively through each of the segregated arcuate portions of the annular chamber 18 of the engine.

The increased gas volume of the engine as the length of the engine is increased is served by the plural air ports shown to thus maintain direct cross ventilation of the annular chamber. Continuous combustion is favorable to increases in length, but the initial starting ignition by electric spark where the engine has been lengthened would be best served by the plural spark plugs as previously suggested.

The four faced valves (faces 15—15 and 57—57) provide strength to offset the increase in length as well as serving the basic timing requirements of this engine and providing broad faces for sealing engagement between the valve and valve cavities and between the valves and the rotor and piston surfaces.

Sealing engagement is provided between each end of the rotor and the enclosing surfaces of the stator end rings 36—37 by conventional means (not shown), to prevent radial and circumferential leakage due to differential pressures. The ends of all piston abutments 19 and cutoff abutments 28 are included in this sealing engagement.

Due to the continual nature of the compression and combustion events on the active segment of the rotor, heat or heated gases ahead of the direction of rotation of the piston is desirable to obtain advanced gas ignition. This is provided and controlled by the position on the stator of the compressed charge pocket 12 with respect to the piston 19 to expose the charge for ignition at the time to maintain continuous combustion.

As described, sealing engagement is maintained between the rotor R and the valves 4, and this sealing effect is aided by the counter drag of the gases on the surfaces of the rotor R and the valves 4 as they pass in opposite directions in sealing engagement.

The ellipsoidal cross sectional contour of the valves 4 is a basic factor in the construction of this type of engine. All the valves 4 are identical on the same engine. The four surfaces of each valve 4 (15—15, 57—57) are circular arcs. The two narrow arcs 15—15 are equal, opposite, concentric, and rotate in sealing engagement with the cylindrical walls of the valve pocket 5 and with the cylindrical surfaces of the rotor R. The two wide arc surfaces 57—57 on each valve 4 are also equal and opposite, but eccentric and make sealing contact only with the crest of the piston 19. Two of the four corner elements formed by the intersection of the circular arc surfaces of each valve 4 make sealing engagement with the compression abutment or piston 19. The other two make sealing engagement with the cutoff abutment 28.

It will be noted that each valve 4 rotates only one-half a revolution (180°) for each complete gas cycle and that each valve serves as a barrier separating the gas cycles in adjacent segregated arcuate combustion spaces in the annular chamber. Hence, each valve concurrently performs the initial steps of a cycle in one combustion space on one side of the valve and the closing cycle steps in the adjacent combustion space on the opposite side of the valve. The valves are balanced in design and functions, and the pressures on their faces are always equalized except for the negative gas drag effect and the positive drive force hereinabove referred to the valve receives as the piston 19 passes each valve 4. Valve rotation during any single event of the gas cycle has little rotational effect on the gasses because the valves 4 serve only as barriers to channel or confine the gas for the events of the gas cycle. The direction of valve rotation is favorable to the movement of the exhaust and cooling air through the valve pockets 5; to the entrapment of intake air for compression also for streamlining the stator wall during compression; and for extending the combustion-expansion event through nearly two adjacent segregated segments of the annular combustion chamber before "cutoff."

The ratio of the short diameter to the long diameter of a valve 4 determines the radial dimension of the annular combustion chamber 18 of the stator S. The short diameter of the valve 4 determines the permissible length of the valve shaft 33 between bearings 38 and hence the longitudinal dimension of the rotor R and hence the gas volume capacity of the segregated portions of the annular combustion chamber 18 of stator S. The short diameter also governs the intake capacity for air circulation within the valve 4 and of greatest importance it governs the size of the arc of the narrow face 15 of the valve 4 which in turn partly governs the timing and duration of gas cycle events.

The long diameter of the valve 4 determines the diameter of the valve pockets 5, their air passage capacity and the size of the exhaust ports 8. The radius of curvature of the long arc surfaces 57 of the valves 4 is determined by the number of pistons or gas cycle segments on the rotor and by the rotor dimensions, since the surfaces of the compression abutment 28 as well as the crests of the pistons 19 must pass each valve 4 in sealing engagement.

On a rotor having two pistons and gas cycle segments the radius of the rotor extended to the axis of any valve is also the radius of curvature of the compressor abutment surface and the radius of the long arcs 57 of the valves. This equality is related to the fact that a rotor with two pistons and gas cycle segments as well as each of the valves performs two gas cycles in one revolution. This results in a 1:1 ratio in the rotation of the rotor and valves, regardless of the ratio of their respective diameters. The speed ratio is of course controlled by timing gears with a 1:1 ratio.

The cooling of the stator can be adapted to the engine requirements, and although a water jacket is indicated in FIGS. 1 and 2, air cooling may be utilized in lieu of the water jacket if preferred or more suitable for the size of engine and operating conditions, as previously suggested.

While I have described the compressor C drawing in air through its opposite end openings 42, it will be understood that such air may be at atmospheric pressure or at an elevated pressure by reason of preliminary treatment in some conventional fluid compressor means to thus raise the pressure of the air or air and fuel mixture delivered to the annular combustion chamber 18.

FIGS. 22 and 23 show diagrammatic cross sectional views of engines having varying number of pistons and gas cycle segments on their rotors. FIG. 22 has one piston and one gas cycle segment on the rotor R100 and three valves 104 to provide three segregated segments within the annular chamber of the stator.

This engine performs three complete gas cycles in one revolution of the rotor R100. The number of gas cycles performed in one revolution of the rotor R100 is the product of the number of pistons or gas cycle segments on the rotor and the number of valves. Its rotor speed however is twice that of its valve speed because the valves 104 perform two gas cycles per valve revolution. Consequently, the rotor to valve speed ratio is 2:1 and the rotor can run at a high rate of revolutions per minute without impairing the efficiency of the gas cycle operation.

FIG. 23 shows a view similar to that of FIG. 22, of an engine the rotor R300 of which is provided with four pistons 319 and four gas cycle segments, together with twelve valves 304 in the stator. In this engine the ratio of rotor speed to valve speed is 1:2, and the timing gears are designed accordingly.

Torque is increased as speed is reduced in the design of this form of engine with the same size and velocity of the valves by increasing the number of pistons on the rotor and using a suitable speed reduction in the timing gear train. For example, a four piston rotor running at ½ the speed of a two piston rotor with the same size gas cycle segments on the rotor would develop twice the horse power, and four times the torque.

It will be noted that in all of the engine modifications herein disclosed, the relationship of 1:3 is maintained between the number of rotor pistons (or gas cycle segments) and the number of valves in the stator, and so long as this relationship is maintained, engines having any desired number of pistons may be designed. In each instance the ratio of rotor speed to valve speed will be determined by the arcuate extent in degrees of a gas cycle segment on the rotor since in all engines within the concept of this invention, the valves perform a complete gas cycle for every 180° rotation. Thus, for an engine having six gas cycle segments (or pistons) and 18 valves, the ratio of rotor speed to valve speed will be 1:3.

Figure 1:
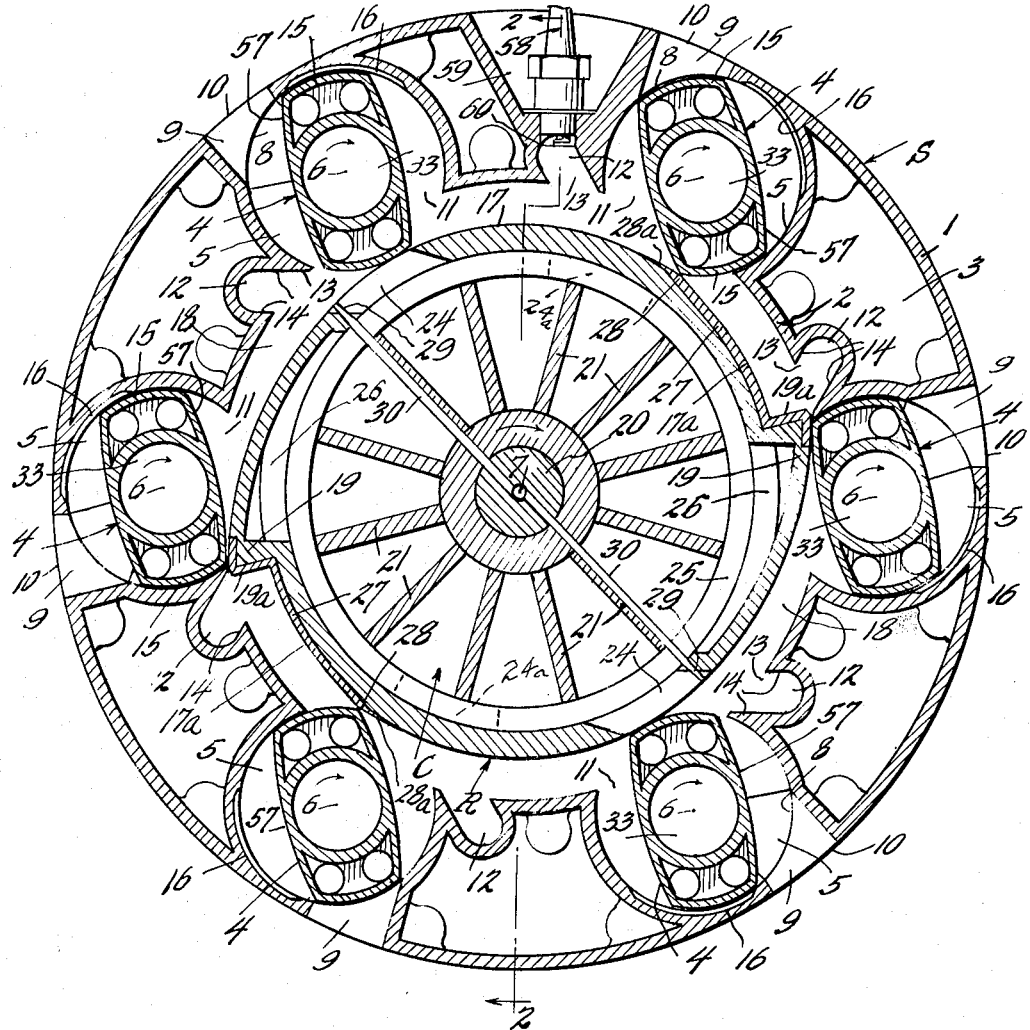
FIG. 1 is the basic type in which the rotor to valve ratio is 1:1. An engine with valves 4 and rotor geared to run at the same r.p.m. affords the basis for the widest speed range for varying uses as well as flexibility in operation.
Figure 2:
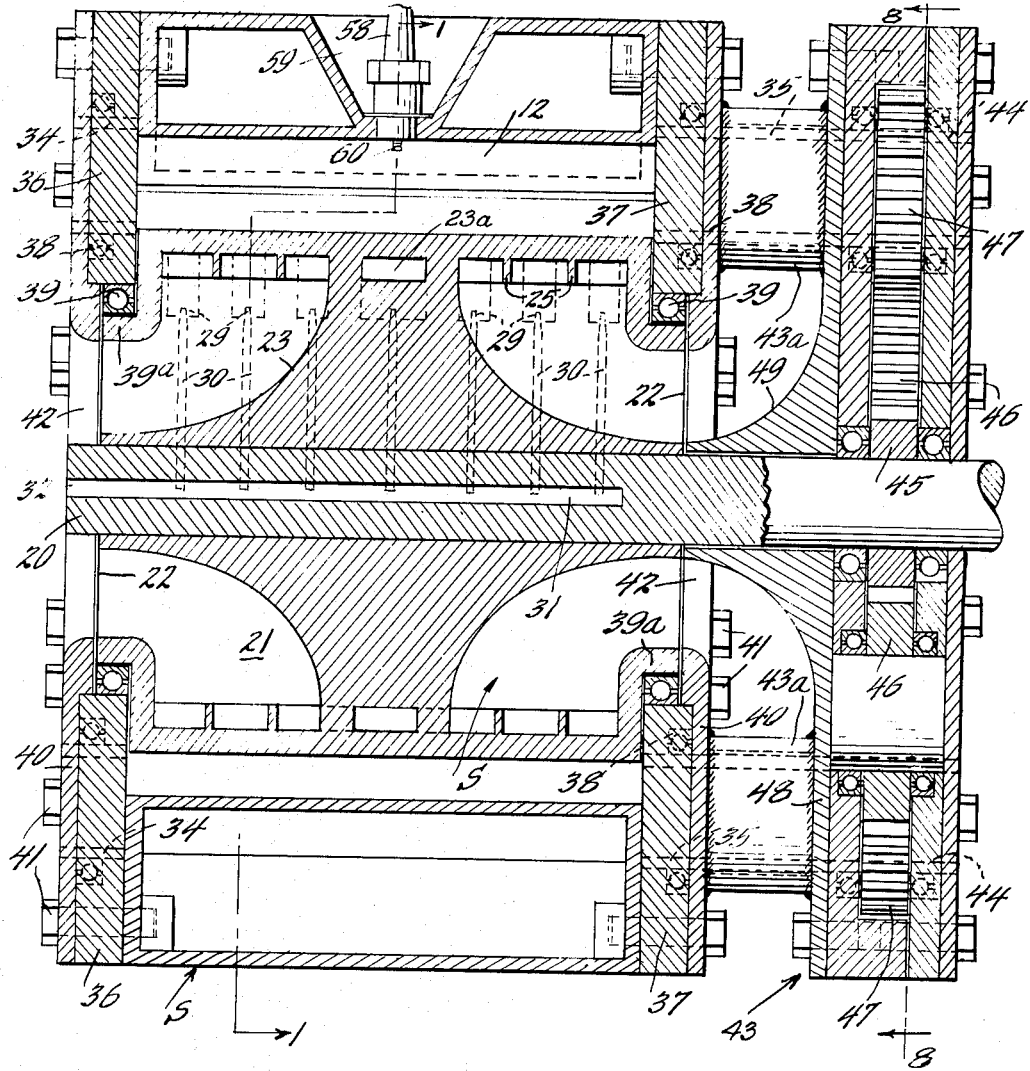
Figure 8:
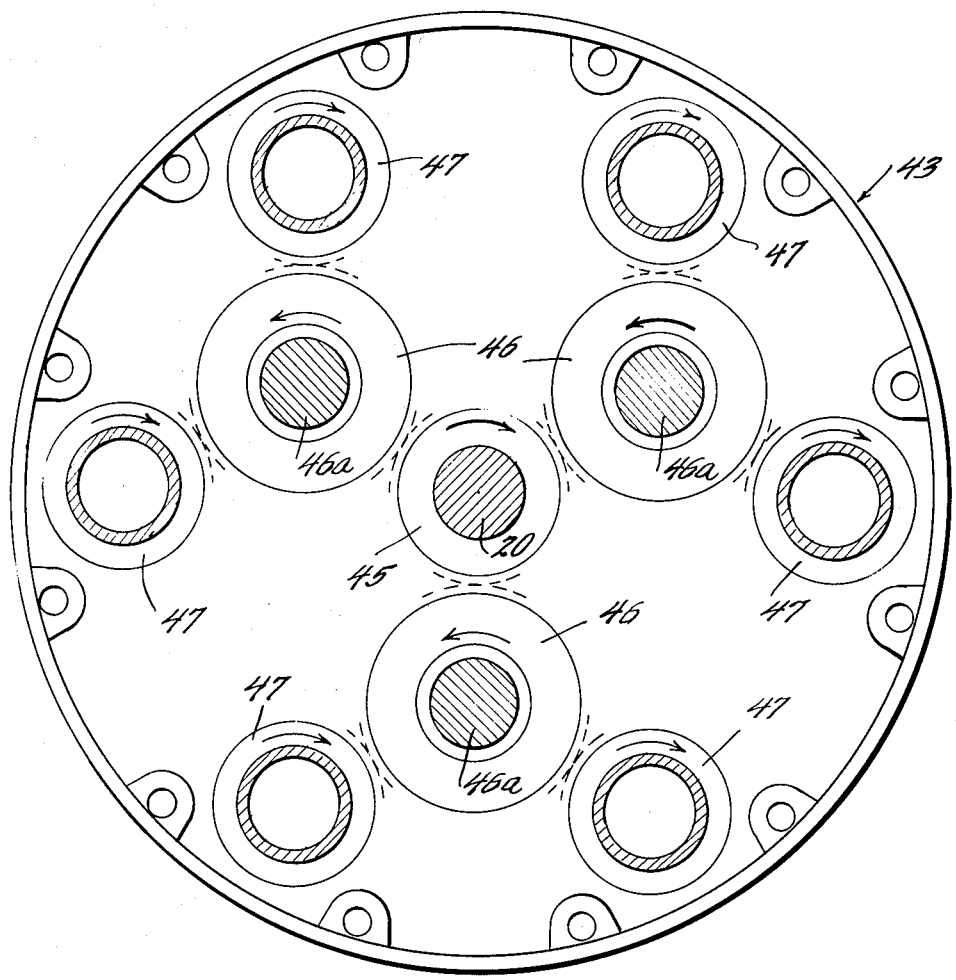
Figure 13:
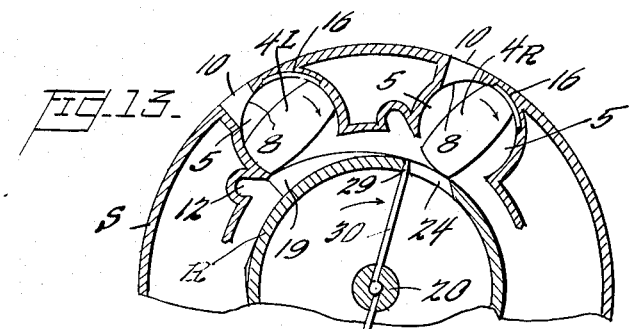
Figure 14:
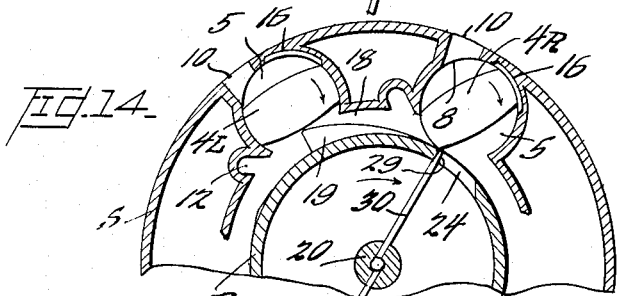
Figure 15:
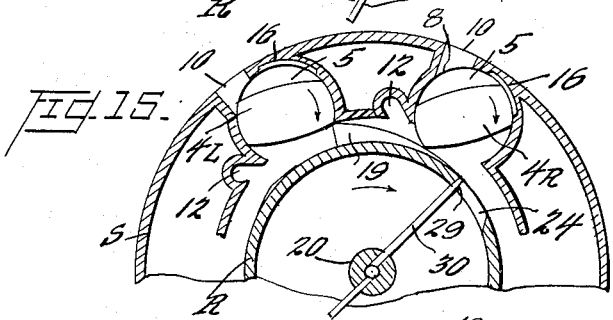
Figure 16:
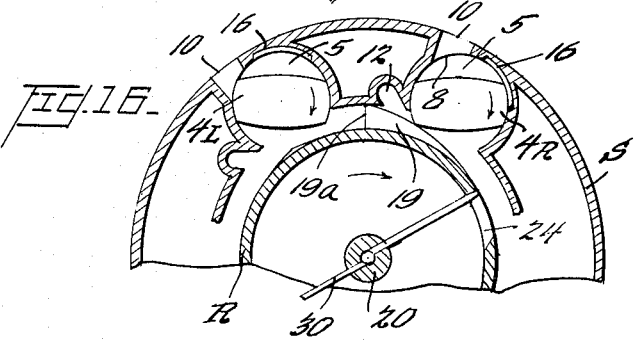

The gas cycles performed in adjacent combustion spaces are phased progressively at 60° of a valve rotation in timing entirely around the stator regardless of the number of pistons on the rotor. This relationship applies to engines having three valves per piston, as shown in FIGURES 1, 22, and 23 of the drawings. The difference in phase of the cycles in adjacent combustion spaces varies with the number of valves per piston, for example, in an engine with four valves per piston the gas cycles are progressively phased 45° of valve rotation in timing between adjacent combustion spaces.

The engine is also suitable for multiple tandem drives on the same drive shaft with a single timing gear set, by extending the rotor shaft 20 an amount to project through the gear case such as 43, and connect on the far side thereof to the rotor shaft of a second engine of like speed and torque, and equipped with similar accessories such as ignition, fuel supply, cooling, etc. The pistons of tandem engines should be mounted on the rotor shaft with angular spacing in displacement to obtain the best uniform distribution of power impulses. Variation in horse power may also be obtained by variation in the size and speed of the gas cycle components. The engine may be supported in any convenient manner, as by wing plate shown in dotted lines in FIG. 1.

Having thus described my invention what I claim as new is:

1. A rotary internal combustion engine comprising a stator member having generally the form of a hollow cylinder, a generally cylindrical rotor member mounted for rotation coaxially within the stator member, said stator and rotor members respectively presenting opposed wall members disposed in radially spaced relation and defining between them an annular chamber generally concentrically disposed with respect to the axis of rotation of the rotor member, a centrifugal compressor within the rotor member for charging a compressed gaseous fuel mixture through said annular chamber and radially through inlet ports in said wall of the rotor member, valve cavities provided in said stator member spaced circumferentially thereof, a valve member in each valve cavity, the valve cavities being each provided with first port means opening into said annular chamber and an exhaust port means, each of said valve members being mounted for rotation within the respective cavities about an axis generally parallel to the axis of rotation of the rotor to thereby control fluid flow through said first port and said exhaust ports, said valve members each including a pair of diametrically opposed portions radially dimensioned to extend successively through said first ports and into said annular chamber when the valves are rotated, piston means projecting from said ported wall of said rotor into said annular chamber and sealingly engaging the opposed wall of the stator between successive valve cavities and sealingly engaging successively the portions of the valve members projecting through said first ports, and means for interconnecting the valve members and said rotor member for rotation in timed relation to position simultaneously in said annular chamber the projecting portions of adjacent valve members successively thereby to segregate successive gaseous charges within said annular chamber between pairs of adjacent valve members when so positioned, cut-off abutment means on said rotor spaced rearwardly from the respective piston means and engageable by said valve members respectively prior to opening said exhaust port means, thereby trapping a volume of burning gas between said abutment and the next adjacent piston in the direction of rotation of said rotor whereby to maintain continuous combustion and a working pressure on said piston during the exhaust period and to perform a complete gas cycle comprising admission, compression, combustion-expansion and exhaust on the thus segregated gaseous charges successively within each of said segregated portions of the annular chamber.

2. The rotary engine described in claim 1 wherein said valve cavities are generally cylindrical in form and extend parallel to the axis of rotation of the rotor, and said valves are generally ellipsoidal in cross section contour, and wherein the ports of said valve cavities are disposed in general radial alignment with respect to the axis of rotation of the rotor.

3. The rotary engine described in claim 1 wherein the valve members are hollow and are mounted for rotation on hollow open-ended shafts extending through end walls of the stator member, said shafts being provided with radial ports communicating with the interior of said valve, said valve members being provided with discharge ports disposed radially outward of the axis of rotation of the valve and port means in the stator when intermittently in register with said discharge ports whereby a current of cooling air is induced through the hollow shaft ends and out through said discharge ports when the valves are rotated.

4. The rotary engine described in claim 1 wherein the ported wall of the rotor on its inner surface is provided with cooling rigs disposed in the path of air flowing through the compressor.

5. In a rotary internal combustion engine, stator and rotor members defining between them an annular combustion chamber having generally cylindrical radially spaced ported walls, said rotor including means comprising a centrifugal compressor for delivering a gaseous fuel charge under pressure to said annular chamber and radially through ports in the ported wall of the rotor, valve cavities provided in the stator and a rotatable valve mounted in each of said cavities, each valve cavity having a pair of generally radially aligned ports at opposite ends of a radially-extending exhaust passage controlled by said valves respectively, piston means carried by the rotor and projecting into said annular chamber, and inwardly directed cooling ribs carried by the inner surface of said ported wall of the rotor whereby air drawn into the compressor passes successively over said vanes, into said annular chamber through the ported wall of the rotor, and through said valve cavities and around the exterior surfaces of the valves therein in a generally radial direction, to cool interiorly the surfaces defining the ported wall of the rotor, both of the rotor and stator walls defining the annular chamber, the rotating valves, and the portions of the stator proximate to the valve cavities.

6. In a rotary internal combustion engine as described in claim 5, said valve cavities being generally cylindrical in cross section and said valve members being generally ellipsoidal in cross section and means for centrifugally inducing air flow through said valve members additionally to cool the same when the valves are rotated.

7. In a rotary internal combustion engine as described in claim 5, said valve cavities each being provided with an interior generally cylindrical valve-contacting surface generally concentric to the axis of rotation of the valve, said surfaces in the several valves being pierced by the exhaust ports in the respective valve cavities, the inner walls of the valve cavities beyond said exhaust ports in the direction of rotation of the valve being formed to provide air passages communicating with the said ports to conduct exhaust gases and air around the exterior surfaces of the valve for the exhaust, scavenging and cooling steps in combustion cycle.

8. In a rotary internal combustion engine having a stator member and a rotor member, means defining an annular chamber therebetween, piston means on the rotor projecting radially therefrom and into said annular chamber, valve means in the stator and projecting into said annular chamber, and means interconnecting the rotor member and valve members for rotation in timed relation to permit free movement of the piston means within said annular chamber, said piston means sealingly engaging the surfaces of the valve members, the surfaces of the piston and adjacent wall portions of the rotor being covered with heat resistant refractory material.

9. In a rotary internal combustion engine, a stator having a generally cylindrical cavity centrally thereof, a generally cylindrical rotor mounted for rotation within said cavity about an axis generally concentric thereto, said stator and rotor members having wall portions defining between them a generally annular chamber, piston means carried by the rotor and projecting into said annular chamber, circumferentially spaced exhaust valve members mounted on the stator and having portions projecting into said annular space for engaging said rotor for successively segregating portions of said annular chamber between adjacent valves, means for driving the rotor and valve members in timed relation to permit free passage of the piston means throughout the annular chamber, a compressed charge cavity within the stator adjacent to each valve and opening into said annular chamber ahead of said valves in respect to the direction of rotor movement, two-stage compression means including said piston means and a compressor mounted within the rotor for delivering a compressed charge of gaseous fuel mixture to said compressed charge cavity.

10. In a rotary internal combustion engine as described in claim 9, means for performing on the gaseous charge within each of said segregated portions of the annular chamber a complete gas cycle including burning the charge from the compressed charge cavity, expanding said burning charge against said piston means, exhausting the burned gases and scavenging the segregated portion between the valves before admitting a fresh fuel mixture charge thereto said last-mentioned means including cooperating means carried jointly between several valves and said rotor for separating a portion of a burning charge of gases within a segregated portion of said annular chamber and exhausting one portion of said segregated charge while maintaining the other burning portion of said charge in driving relation to a piston.

11. In a rotary internal combustion engine, a stator having a cavity within which is mounted a rotor member, said stator and rotor members including means for defining an annular chamber therebetween, exhaust valve means in the stator and means mounting the valve members for rotation about axes generally parallel to the axis of rotation of the rotor, piston means carried by the rotor, said piston means and said valve members projecting into said annular chamber from opposite directions, and means interconnecting the valves and rotor for timed operation to permit continuous rotation of the piston within the annular chamber, a centrifugal compressor within the rotor for delivering air under pressure to said annular chamber, means carried by the rotor for delivering fuel to said annular chamber, adjacent pairs of valve members projecting into said annular chamber and operating successively to segregate portions of the annular chamber containing a gaseous mixture of air and fuel, while said piston means concurrently compresses further said gaseous fuel charge within said segregated portion of the annular chamber, said piston means having a generally radial rear working face and a generally arcuate forward face, a continually open air port in the rotor in advance of said arcuate portion of the piston and means for admitting fuel into a segregated portion of said chamber, a compressed charge cavity in the stator between each pair of valves and into which the charge within the segregated portion of the annular chamber is compressed by the arcuate face of the piston, said compressed charge cavity having a discharge port directed inwardly of said annular chamber in the direction of rotation of the rotor and towards the rear working face of the piston at the time of firing, and an exhaust port controlled by each of said valves.

12. In a rotary internal combustion engine comprising a stator member, a rotor member mounted for rotation within the stator member, means defining an annular chamber between the stator and rotor members and surrounding the rotor, means for feeding fuel and air into said annular chamber, valve means for segregating arcuate segments of said annular chamber, means for rotating the valve members and the rotor in timed relation to successively segregate such segments in respect to a given direction of rotation of the rotor, exhaust ports controlled by said valves, piston means carried by the rotor for compressing charges within such segregated portions of the annular chamber, ignition means for firing an initial charge in one of said charged segments and cut-off abutment means carried by the rotor and engageable by the respective valves for separating said fired charge into a segment forward of said abutment and a trailing segment whereby the flame remaining in said forward segment may be used for igniting a new compressed charge just prior to exhaust of gases from said trailing segment.

13. The apparatus described in claim 12 wherein said air and fuel feeding means include continuously open ports between sources of air and fuel and said annular chamber.

14. The apparatus described in claim 12 wherein the air and fuel charges are fed to the annular chamber by a rotary air compressor within the rotor through continuously open ports in the wall of said rotor.

15. The apparatus described in claim 12 wherein said valve members are generally ellipsoidal in cross section, the exterior surfaces of the valves at the ends of the long axis being circular arcs of equal radius concentric with the axis of rotation of the valve, and the exterior surfaces of the valves at the ends of the short axis thereof being generally circular arcs of equal radius but longer than the radius of the arcs at the ends of the long axis and the centers of which are eccentric to the axis of rotation of the valve, said piston means including plural piston members carried in circumferentially spaced relation by said rotor and extending into said annular chamber, the concentric arcuate wall portions of the valves sealingly engaging the peripheral surface of the rotor between successive pistons, and eccentric arcuate walls sealingly engaging the surfaces of the pistons whereby effectively to seal successive segregated charges within successive segments of the annular chamber, the line of juncture between the arcuate surfaces of the valve engaging said abutment means to provide cutoff between the burning gases to be exhausted and said fresh charge.

16. In a rotary internal combustion engine, a stator having a central cavity, a rotor member mounted for rotation coaxially within said cavity, said stator and rotor members defining between them an annular charge receiving chamber, means for delivering a gaseous charge to said annular chamber including a compressor mounted within the rotor and adapted to discharge a gaseous combustible mixture through continuously open ports into the annular chamber, ellipsoidal valve means mounted in the stator in circumferentially spaced relation and each valve means including a valve portion dimensioned to project into the annular chamber, means for rotating the valves and rotor in timed relation including a gear train, means for housing the gear train in axially spaced relation to the rotor and stator members to provide an insulating air space therebetween, said compressor means having a central intake drawing air through the space between the rotor and stator members and the gear casing whereby to cool the wall of the gear casing adjacent the adjacent ends of the rotor and stator members.

17. In a rotary internal combustion engine, a rotor of general cylindrical form, piston means extending generally radially from the outer peripheral surface thereof, a cutoff abutment on the surface of said rotor in circumferentially spaced trailing relation to said piston, a stator within which the rotor is cooperatively mounted for rotation, exhaust valve means in said stator and means for driving the rotor and valves in timed relation, said valve means being dimensioned to successively engage in sealing relation the piston and said cutoff abutment whereby to cut off a portion of a charge of burning gas driving said piston for exhaust thereof while maintaining driving force of the remaining portion of said charge active upon said piston.

18. The engine described in claim 17 wherein the surface of the rotor between the piston and the next adjacent trailing cutoff abutment is cut away to preclude engagement of said valve means therewith, whereby to maintain an unobstructed passage between the valve and the rotor surface at this point for flame propagation between burning gases in front of the cutoff abutment and a compressed fuel charge on the trailing side of the piston means.

19. The engine described in claim 17 wherein said piston is provided with a convexly arcuate forward face and a rearwardly facing working face, said working face being disposed generally radially of the rotor axis, fuel mixture ports in the surface of the rotor in advance of said piston and means for feeding fuel mixture through said ports.

20. The engine described in claim 18 wherein a trailing face of the cutoff abutment is reversely positioned but of substantially the same convex curvature as is the forward face of the piston.

21. The engine described in claim 19 wherein the rotor includes fluid compressor means for centrifugally compressing fuel and air delivered thereto, and means for discharging the compressed fuel and air through said ports.

22. The engine described in claim 18 wherein there is at least one piston on said rotor, and wherein there are three times as many valve members in the stator as there are pistons on the rotor, said valve members being equally spaced circumferentially about the stator.

23. The engine described in claim 19 wherein there is provided an annular combustion chamber between the rotor and stator and the rotor is ported for the admission of fuel into said chamber, and wherein said last-mentioned means includes a longitudinally-extending bore in the shaft of the rotor opening through one end of the shaft, radially disposed tube members carried by the rotor and having their inner ends in communication with said bore and their radially outer ends arranged to discharge fuel flowing through the tubes substantially radially outward of the rotor and through the port thereof into said combustion chamber, the open end of the bore in the rotor shaft being adapted for connection to a source of fuel supply.

24. In a rotary internal combustion engine a rotor of general cylindrical form, piston means extending generally radially of the outer peripheral surface thereof, a cutoff abutment on the surface of the rotor in circumferentially spaced trailing relation to the piston, a stator within which the rotor is cooperatively mounted for rotation, opposed wall portions of the stator and rotor defining therebetween an annular combustion space, valve means in said stator projecting into said annular space, and means for driving the rotor and valves in timed relation to provide for free rotation of the piston means within said annular space, said valve means being dimensioned to successively engage in sealing relation the piston and said cutoff abutment to effectively seal off the gas rearwardly of said abutment for exhaust while maintaining continued combustion and driving force on said piston by gases forward of said abutment, said piston means being provided with an arcuate leading surface conforming to the path of travel of a longitudinally extending surface portion of the valve whereby to maintain sealing contact between the valve and the arcuate portion of the piston, and means for delivering to said annular chamber fuel and air, the admission of fuel being disposed at a point on the arcuate surface of said piston and the air being delivered at a point forward of the fuel inlet.

25. The engine described in claim 23 wherein the discharge ends of said radially-disposed tubes are disposed within the ports in the wall of said rotor.

26. The method of operating a rotary internal combustion engine having an annular gas chamber, comprising delivering a combustible charge of air and fuel to said chamber, segregating a segment of said charged annular chamber, compressing the charge within said segregated segment, and then completing the gas cycle within said segregated segment by burning said charge, expanding the burning charge, cutting off a portion of the expanding charge from the rest of said charge while maintaining the driving force thereof on said rotor and exhausting the thus cut off portion of said gases, and scavenging the residual gases from the cut-off portion of said segment.

27. The method described in claim 26 wherein successive segments of said charged annular chamber are segregated, and wherein burning gases from a trailing segment are carried forward into an adjacent leading segment just prior to cutoff for exhaust to maintain continuous combustion of gases within said annular chamber.

28. The method described in claim 26 wherein the rotary internal combustion engine includes a rotor having a piston extending into and freely movable within said annular gas chamber, and wherein said piston is moved into a segregated charged segment prior to burning the charge therein, and directing the expansive force of the burning charge against the working face of the piston, to drive the rotor.

29. The method of operating a rotary internal combustion engine having rotor and stator elements, an annular combustion space surrounding the rotor, at least first, second and third valve members spaced circumferentially of the stator and movable selectively into the annular combustion chamber to successively segregate adjacent arcuate segments thereof, and operating in timed relation with the rotor to permit the free rotation within said annular combustion chamber of the piston carried by the rotor, said method comprising segregating a first arcuate segment of said annular combustion chamber by said first and second valves, charging said first arcuate segment with a combustible mixture, compressing said charge within said first segregated segment by said piston moving within said segregated segment from said first valve member towards said second valve member, transferring the compressed charge from the leading side of the piston to the trailing side thereof, firing said compressed charge and directing the force of the resulting expanding gases against the trailing face of the piston, withdrawing said second valve member from said annular combustion space to provide free movement of the piston past said second valve member, and maintaining the expansive force of said burning gases on said piston while the same moves through a substantial portion of that portion of the annular combustion chamber located between said second valve member and said third valve member.

30. The engine described in claim 18 wherein the surface of the rotor between the piston and the next adjacent trailing cutoff abutment and said abutment is covered with heat resistant material.

31. In a rotary engine including a hollow generally cylindrical stator, a generally cylindrical rotor mounted within the stator for rotation about the axis thereof, said stator and rotor being dimensioned to define therebetween an annular combustion chamber, pistons carried by the rotor and projecting radially therefrom into said annular combustion chamber, plural generally cylindrical valve cavities within and circumferentially spaced about said stator, said valve cavities being provided with ports communicating with said annular combustion chamber, a valve in each of said valve cavities mounted for rotation about an axis generally parallel to the axis of rotation of the rotor, said valve member being generally ellipsoidal in cross sectional contour and presenting two broad faces disposed respectively at opposite ends of the short axis thereof and two narrow faces disposed respectively at the opposite ends of the long axis thereof, means for feeding a combustible charge into said annular combustion chamber and means for connecting said rotor and said valve for operation in timed relation so that when a combustible charge in said annular combustion chamber is fired, said rotor is driven about its axis by resulting gas pressure effective on said pistons and said valves are rotated in timed relation thereto so that as the piston passes the port in said valve cavity the valve therein is in position to receive on one of its broad faces the gas pressure behind said piston whereby a positive turning couple is applied to said valve.

32. In a rotary engine including a stator, a rotor mounted within the stator for rotation about the axis thereof, said stator and rotor being dimensioned to define therebetween an annular combustion chamber, a piston carried by the rotor and projecting radially therefrom into said annular combustion chamber, a valve cavity within said stator, said valve cavity being provided with a port communicating with said annular combustion chamber, a valve in said valve cavity mounted for rotation about an axis generally parallel to the axis of rotation of the rotor, said valve member having elongated alternate broad and narrow faces, means for feeding a combustible charge into said annular combustion chamber and means for connecting said rotor and said valve for operation in timed relation so that when a combustible charge in said annular combustion chamber is fired, said rotor is driven about its axis by the resulting gas pressure effective on said piston and said valve is rotated in timed relation thereto so that as the piston passes the port in said valve cavity the valve therein is in position to receive on one of its broad faces the gas pressure behind said piston whereby a positive turning couple is applied to said valve.

33. A rotor for rotary internal combustion engines comprising a generally hollow cylindrical body member adapted to be mounted for rotation about its longitudinal axis within a stator, said body member having at least one piston member projecting from its external surface and extending substantially from end-to-end of the rotor generally parallel to the axis thereof, the interior of the rotor including a centrifugal air compressing structure including a central air guide member and radial vanes, said vanes terminating short of the outer wall of the rotor to provide for an annular plenum chamber between the walls of the rotor and the ends of said vanes, the central air guide member being connected to the outer wall of the rotor and in the region of juncture therewith being provided with a circumferential channel, the air guide member being provided with lateral inlet ports communicating with said channel member and opening out through said guide member into the interior of said rotor on opposite sides of the guide member, and outlet ports leading from said channel through the outer wall of the rotor whereby cooling air is circulated through said channel.

34. The rotor described in claim 33 wherein said piston member is generally hollow and the interior thereof is exposed to and in communication with said plenum chamber through ports provided in the wall of the rotor.

35. The rotor described in claim 34 wherein ports are provided in said channel member opening into the hollow interior of said piston member.

36. In a method of operating a rotary engine including a rotor-carried piston movable within an annular combustion chamber in which successive segments thereof are successively isolated by three exhaust valve members rotating in timed relation to the rotor and spaced circumferentially about the stator, the steps of charging an isolated segment of said combustion chamber with a gaseous fuel mixture, compressing said fuel mixture between first and second of said valves by said piston, firing and burning said mixture and rendering the resulting pressure effective on said piston to drive the same past said second valve and into the space between the second and third valves, cutting off a portion of said burning mixture at a point rearward of said piston by said second valve for exhaust, while maintaining the remainder of said burning charge in driving relation with the piston, and exhausting the cut-off portion of said burning mixture while continuing to drive the piston under the influence of pressure developed by said burning mixture.

37. In a rotary engine, a stator, a rotor mounted therein for rotation, a piston mounted on said rotor for movement through an annular combustion chamber provided between the stator and rotor, three exhaust valves mounted for rotation in said stator in circumferentially spaced relation, said valves including portions movable through said combustion chamber in sealing engagement with said rotor and piston, means for charging a combustible mixture into said annular combustion chamber, means interconnecting said valves and rotor for rotation in timed relation to provide for free movement of said piston within said chamber past said valves, whereby to compress a charge trapped between two adjacent valves, means for firing and burning said compressed charge against a working face of said piston to drive the same past said second valve towards said third valve, a cut-off abutment on said rotor rearward of said piston and engageable by said second valve to isolate a portion of said burning charge rearward of said abutment for exhaust while maintaining the portion of said burning charge between said abutment and said piston in operative driving relation with the piston, whereby to continue the driving impulse of said burning charge on said piston through the exhaust.

References Cited by the Examiner

UNITED STATES PATENTS

| | | | |
|---|---|---|---|
| 2,275,205 | 3/1942 | Straub | 123—13 |
| 2,362,705 | 11/1944 | Macartney et al. | 123—13 |
| 2,418,793 | 4/1947 | Selden | 123—13 |
| 2,794,429 | 6/1957 | Walter | 123—13 |

FOREIGN PATENTS 55,075  8/1943  Netherlands.

MARK NEWMAN, *Primary Examiner.*

KARL J. ALBRECHT, *Examiner.*

ROBERT M. VARGO, *Assistant Examiner.*